US010828653B2

(12) United States Patent
Healy

(10) Patent No.: US 10,828,653 B2
(45) Date of Patent: Nov. 10, 2020

(54) SERVICEABLE SPRINKLER WITH NUTATING DISTRIBUTION PLATE AND WEAR RING

(71) Applicant: Senninger Irrigation, Inc., Clermont, FL (US)

(72) Inventor: Mark Healy, Orlando, FL (US)

(73) Assignee: Senninger Irrigation, Inc., Clermont, FL (US)

(*) Notice: Subject to any disclaimer, the term of this patent is extended or adjusted under 35 U.S.C. 154(b) by 0 days.

(21) Appl. No.: 16/058,766

(22) Filed: Aug. 8, 2018

(65) Prior Publication Data

US 2020/0047195 A1   Feb. 13, 2020

(51) Int. Cl.
*B05B 3/04* (2006.01)
*B05B 3/08* (2006.01)
*B05B 3/02* (2006.01)
*A01G 25/02* (2006.01)
*B05B 3/10* (2006.01)
*B05B 3/00* (2006.01)

(52) U.S. Cl.
CPC ............ *B05B 3/0463* (2013.01); *A01G 25/02* (2013.01); *B05B 3/008* (2013.01); *B05B 3/025* (2013.01); *B05B 3/08* (2013.01); *B05B 3/1021* (2013.01)

(58) Field of Classification Search
CPC ....... B05B 3/008; B05B 3/0486; B05B 3/025; B05B 3/1021; B05B 3/08; B05B 3/003; B05B 3/005; B05B 3/007; A01G 25/02
USPC .......................................... 239/222.11, 222.17
See application file for complete search history.

(56) References Cited

U.S. PATENT DOCUMENTS

| 3,799,453 | A | 3/1974 | Hart |
| 5,234,169 | A | 8/1993 | McKenzie |
| 5,699,962 | A | 12/1997 | Scott |
| 6,199,771 | B1 | 3/2001 | Clerman |
| 6,341,711 | B1 | 1/2002 | Sweet |
| 6,439,477 | B1 | 8/2002 | Sweet |
| 6,676,038 | B2 | 1/2004 | Gressett |
| 6,871,795 | B2 | 3/2005 | Anuskiewicz |
| 7,037,960 | B2 | 5/2006 | Ukai |
| 7,287,710 | B1 | 10/2007 | Nelson |
| 7,562,833 | B2 | 7/2009 | Perkins |
| 7,942,345 | B2 * | 5/2011 | Sesser .................. B05B 3/0486 239/222.11 |
| 8,556,196 | B2 | 10/2013 | Lawyer et al. |
| 8,584,969 | B2 * | 11/2013 | Drechsel ................ B05B 3/003 239/222.17 |
| 8,991,724 | B2 | 3/2015 | Sesser |
| 2011/0155827 | A1 * | 6/2011 | Drechsel .................. B05B 1/16 239/589 |

(Continued)

*Primary Examiner* — Chee-Chong Lee
*Assistant Examiner* — Brandon L Scales
(74) *Attorney, Agent, or Firm* — Knobbe, Martens, Olson & Bear, LLP

(57) ABSTRACT

A sprinkler assembly with a nutating distribution plate can improve even distribution of water. The distribution plate can tilt and/or translate upon water impinging the distribution plate to disperse water in different directions. The sprinkler assembly can have a deflector assembly including the distribution plate, a stem supported by a bearing, and a contact portion upstream of the distribution plate to contact an outer race that limits a range of movement of the distribution plate. The sprinkler assembly can be disassembled and reassembled with minimal tools and effort for servicing.

16 Claims, 9 Drawing Sheets

(56) References Cited

U.S. PATENT DOCUMENTS

2013/0327846 A1* 12/2013 Sesser ................. B05B 7/12
                                                239/222.21
2018/0311684 A1   11/2018 Lawyer

* cited by examiner

SERVICEABLE SPRINKLER WITH NUTATING DISTRIBUTION PLATE AND WEAR RING

TECHNICAL FIELD

The present disclosure relates to apparatuses for irrigating turf, agriculture, and/or landscaping.

BACKGROUND

In many parts of the world, rainfall can be insufficient and/or too irregular to keep turf and landscaping green and/or to sufficiently water crops and other agricultural products. Therefore, irrigation systems are often installed to provide adequate irrigation to landscaping and/or agricultural products.

SUMMARY

In certain irrigation applications, it can be advantageous to utilize sprinklers with a nutating distribution plate. For example, sprinklers with a nutating distribution plate can utilize fewer parts than a gear driven sprinkler. Sprinklers with a nutating distribution plate can also be capable of operating using relatively large unobstructed water flow paths for overhead irrigation of large fields and crops. Utilizing larger water flow paths can reduce the need to finely filter or otherwise purify water used for irrigation. In some such cases, water from rivers, streams, lakes, ponds, wells, and/or other water sources can be used with less purification infrastructure than may be necessary for gear driven sprinklers.

However, sprinkler components, such as a nutating distribution plate and components associated with the plate, can be worn due to the nutating movements and need to be replaced. Using less purified water can also result in debris accumulating in the sprinkler components. Servicing the sprinklers to repair or replace components, and/or to clean the components, can be expensive, inconvenient, time consuming, and/or difficult. It can be desirable for sprinklers to be easily serviceable with minimal tools and effort. For example, it would be desirable to be able to service sprinklers with a nutating distributing plate in the field.

In some embodiments, a sprinkler assembly can comprise a water inlet. The assembly can comprise a frame connected to the water inlet. The assembly can comprise a nozzle in fluid communication with the water inlet and positioned downstream of the water inlet, the nozzle configured to direct water out of the nozzle along a nozzle axis. The assembly can comprise a bearing positioned downstream of the nozzle and supported by the frame. The assembly can comprise a deflector assembly between the nozzle and the bearing and supported by the bearing. The deflector assembly can include a distribution plate configured to deflect water from the nozzle, the distribution plate positioned downstream of the nozzle. The deflector assembly can include an upper wear ring support having one or more arms connected to the distribution plate, the one or more arms extending upstream from the distribution plate. The deflector assembly can include a wear ring removably positioned on the upper wear ring support such that the wear ring is positioned downstream of the water inlet and upstream of the distribution plate. The deflector assembly can include an outer race connected to the frame and at least partially surrounding the wear ring, the wear ring having one or more surfaces configured to contact an inner surface of the outer race. The deflector assembly can be configured to move with respect to the nozzle axis in one or both of a rotational and a tilting direction. The bearing can be configured to bear substantially all of a weight of the deflector assembly. The outer race can limit a tilting motion of the deflector assembly.

In some embodiments, the distribution plate can comprise a stem extending from a side of the distribution plate facing away from the nozzle to the bearing. In some embodiments, an open end of the stem can comprise a recess, wherein an entirety of the recess receives the bearing. In some embodiments, the frame can be coupled to a lower bearing housing, the bearing supported by a bearing retainer in the lower bearing housing. In some embodiments, the sprinkler assembly can further comprise a weight between the bearing retainer and an inner wall of the lower bearing housing. In some embodiments, the distribution plate can comprise a plurality of grooves on a side of the distribution plate facing the nozzle, the plurality of grooves configured to deflect water from the nozzle. In some embodiments, the plurality of grooves can be curved. In some embodiments, the outer race can be secured to the frame by a holding nut. In some embodiments, the one or more arms of the upper wear ring support can be coupled to the distribution plate by one or more screws. In some embodiments, the wear ring can comprise a pliable, elastic, resilient, and/or flexible material. In some embodiments, resistance between the one or more surfaces of the wear ring and the inner surface of the outer race can slow or regulate a speed of rotation of the upper wear ring support and the distribution plate.

In some embodiments, a sprinkler assembly can comprise a water inlet. The sprinkler assembly can comprise a frame connected to the water inlet. The sprinkler assembly can comprise a nozzle in fluid communication with the water inlet and positioned downstream of the water inlet, the nozzle configured to direct water out of the nozzle along a nozzle axis. The sprinkler assembly can comprise a deflector assembly downstream of the nozzle. The deflector assembly can comprise a distribution plate configured to deflect water from the nozzle. The deflector assembly can comprise a stem extending from a side of the distribution plate facing away from the nozzle and terminating at a free end. The sprinkler assembly can comprise a bearing supported by the frame and contacting a concave surface of the stem at the free end of the stem. The sprinkler assembly can comprise an outer cover coupled to the frame. The outer cover can comprise an inner surface configured to contact a contact portion of the deflector assembly, the contact portion positioned upstream of the distribution plate. The deflector assembly can be configured to move with respect to the nozzle axis in one or both of a rotational and a tilting direction. The bearing can be configured to bear substantially all of a weight of the deflector assembly. The outer race can limit a tilting motion of the deflector assembly.

In some embodiments, the contact portion can comprise an upper wear ring support having one or more arms connected to the distribution plate on a side facing the nozzle, the one or more arms extending upstream from the distribution plate, and a wear ring positioned on the upper wear ring support, the wear ring having one or more surfaces configured to contact the inner surface of the outer race. In some embodiments, the wear ring can be removably positioned on the upper wear ring support. In some embodiments, the outer race can be secured to the frame by a holding nut. In some embodiments, the one or more arms of the upper wear ring support can be coupled to the distribution plate by one or more screws. In some embodiments, the wear ring can comprise a pliable, elastic, resilient, and/or flexible material.

In some embodiments, a method of providing irrigation using a sprinkler assembly so that water is dispersed in different directions can comprise receiving water at a predetermined pressure at an inlet of the sprinkler assembly; directing water from the inlet through a nozzle positioned downstream of and in fluid communication with the inlet, the water exiting the nozzle along a nozzle axis and impinging a distribution plate of a deflector assembly of the sprinkler assembly, the distribution plate positioned downstream of the nozzle and at a first angular position relative to the nozzle axis; dispersing water out of the sprinkler assembly in a first direction through one or more curved grooves on a side of the distribution plate facing the nozzle; and dispersing water out of the sprinkler assembly in a second direction through the one or more curved grooves of the distribution plate at the second angular position. The distribution plate can rotate and/or translate to a second angular position relative to the nozzle axis as water impinges the distribution plate. A contact portion of the deflector assembly can contact an inner surface of an outer race of the sprinkler assembly during movements of the distribution plate to operably limit inner ranges of movements of the distribution plate, the outer race and the contact portion positioned upstream of the distribution plate In some embodiments, the contact portion can comprise an upper wear ring support having one or more arms connected to the distribution plate on the side facing the nozzle, the one or more arms extending upstream from the distribution plate, and a wear ring removably positioned on the upper wear ring support, the wear ring having one or more surfaces configured to contact the inner surface of the outer race. In some embodiments, the deflector assembly can further comprise a stem extending from the distribution plate on a side facing away from the nozzle and terminating at a free end, and a ball bearing supported by the frame and in contact with the free end of the stem to bear substantially all of a weight of the deflector assembly so that the distribution plate can be configured to rotate and/or translate as water from the nozzle impinges the distribution plate.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

DETAILED DESCRIPTION

Certain Embodiments of a Sprinkler with a Nutating Distribution Plate

Figure 1:
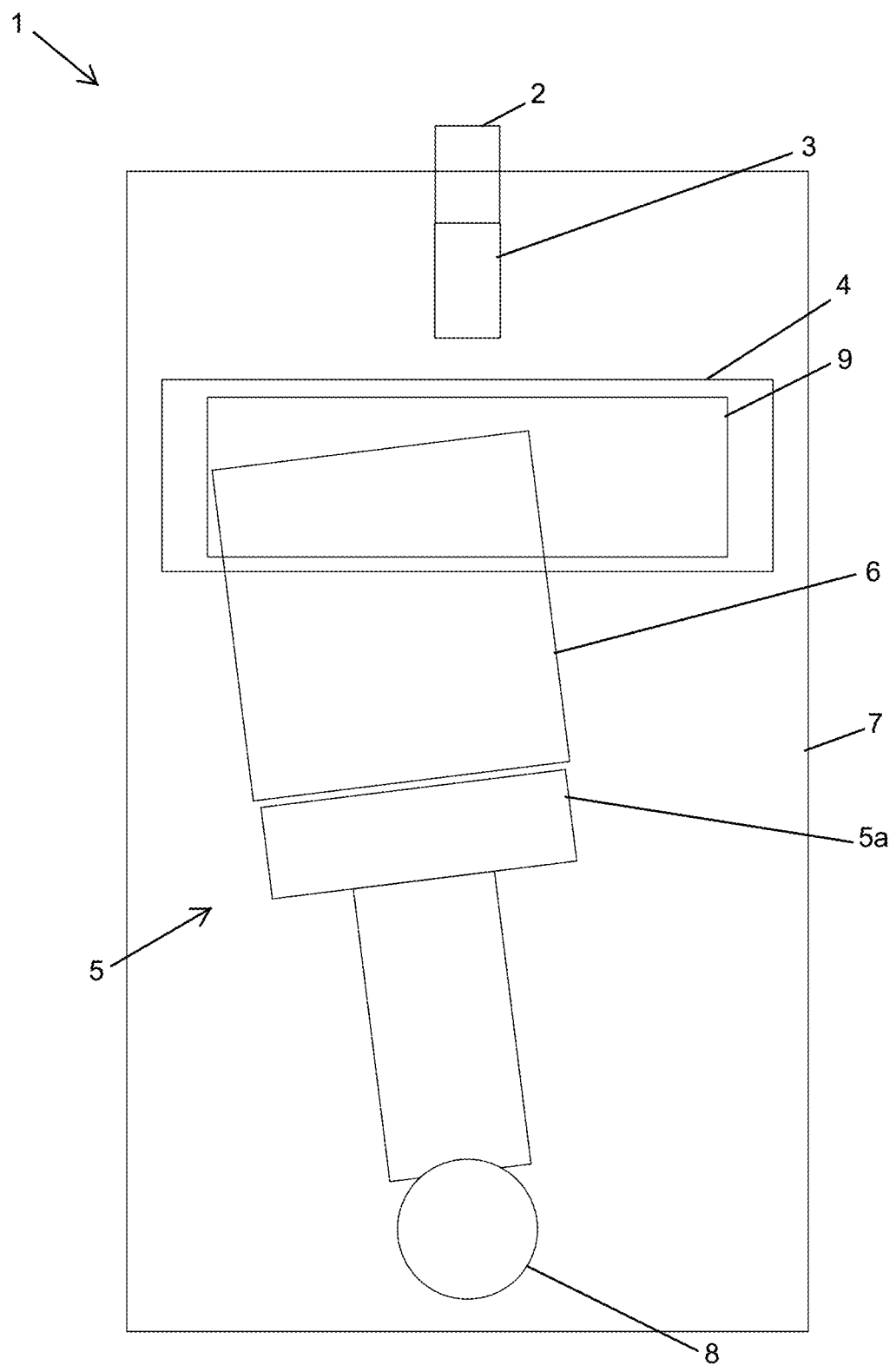
FIG. 1 is a schematic representation of an example sprinkler with a nutating distribution plate.

FIG. 1 schematically illustrates an embodiment of a sprinkler 1 with a nutating distribution plate 5a. The sprinkler 1 can include a water inlet 2. The water inlet 2 can be configured to connect to a water source (e.g., an arm of an irrigation system, a water line, a hose, or some other source of water). The sprinkler 1 can include a nozzle 3. The nozzle 3 can be in fluid communication with the water inlet 2. The nozzle 3 can be configured to output water. In some embodiments, the nozzle 3 can output water in a pressurized manner. In some embodiments, the nozzle 3 can output water along a longitudinal axis of the nozzle 3.

The sprinkler 1 can include a shroud 4. The shroud 4 can be connected to the water inlet 2, to the nozzle 3, and/or to the bracket 7. The shroud 4 can surround at least a portion of the nozzle 3 or be positioned downstream of the nozzle 3.

As illustrated, the sprinkler 1 can include a nutating deflector assembly 5. The shroud 4 can at least partially overlap with the deflector assembly 5 (e.g., in a direction parallel to the longitudinal axis of the nozzle 3). The shroud 4 can protect contact areas of an upper portion of the nutating deflector assembly 5 and an outer race 9 from debris (such as blowing debris or others) to improve sprinkler performance and/or to reduce wear.

The deflector assembly 5 can include a distribution plate 5a. The distribution plate 5a can be positioned downstream of the nozzle 3. In some embodiments, the nozzle 3 is configured to direct water onto the distribution plate 5a. Water impingement on the distribution plate 5a can cause the deflector assembly 5 to "wobble." For example, the deflector assembly 5 can be configured to rotate and/or tilt with respect to the longitudinal axis of the nozzle 3 or some other axis thereof, and/or undergo nutation in reaction to water impingement from the nozzle 3 onto the distribution plate 5a. Wobbling of the deflector assembly 5, including the distribution plate 5a, can allow water to be dispersed in different directions. Dispersing water in different directions can facilitate a more even distribution of water about an area of irrigation than a sprinkler without a deflector assembly or nutating distribution plate. Additionally, the deflector assembly 5 can include an upper wear ring support 6 mounted to the distribution plate 5a on an upstream side of the distribution plate 5a.

The sprinkler 1 can include a bracket 7 attached to the inlet 2. The bracket 7 can support a bearing 8. The bearing 8 can have a spherical or substantially spherical shape, or otherwise a curved surface. The bearing 8 can support the deflector assembly 5 and provide a bearing surface upon which the deflector assembly 5 can move radially and from side to side. The bearing 8 can be a ball bearing. The bracket 7 can further support the outer race 9. The outer race 9 can be positioned downstream of the deflector plate 5a and downstream of the bearing 8 to reduce any forces from the upper portion of the deflector assembly 5 against the outer race 9. The outer race 9 can have an elongated shape to protect an inner surface of the outer race 9 from debris. The shape and/or position of the outer race 9 can reduce wear and extend the usable life of the sprinkler 1. The outer race 9 can surround a portion of the upper wear ring support 6. The outer race 9 can limit the motion of the deflector assembly 5 to keep the distribution plate 5a in a working alignment with the longitudinal axis of the nozzle 3. The working alignment can allow water out of the nozzle 3 to be directed to the distribution plate 5a.

FIGS. 2-7 illustrates a sprinkler 10 with a nutating distribution plate 20 that can have any of features of the sprinkler 1 described above. The sprinkler 10 can include a water inlet 14. The water inlet 14 defines an upstream end of the sprinkler 10. The water inlet 14 can be connected to a bracket 11. In some embodiments, the water inlet 14 is formed as a part of the bracket 11. In some embodiments, the inlet 14 can be a separate piece that is removably or permanently attached to the bracket 11. In some embodiments, the inlet 14 can be formed integrally with the bracket 11. In some embodiments, the inlet 14 can be at least partially surrounded by threads 16. The inlet threads 16 can be screwed into a water supply line on an irrigation system. In some instances, a pressure regulator can be positioned between the water supply line and the sprinkler 10. The threaded inlet 16 can also be screwed into an outlet of the pressure regulator. Other attachment methods, including, but not limited to, glued connections, bayonet mounts, snap rings, keys, or collars can be used to secure a sprinkler to either a water supply line or a pressure regulator.

A nozzle 13 can extend at least partially beyond a downstream end of the water inlet 14. Referring to FIGS. 3-6, the nozzle 13 can direct pressurized water from the inlet 14. For example, the nozzle 13 can direct water to the distribution plate 20. In some embodiments, the nozzle 13 can be coupled to the bracket 11 and positioned downstream from a seal retainer 26. In some embodiments, the seal retainer 26 can be connected to the bracket 11. In some embodiments, the seal retainer 26 can be removably connected to the bracket 11. The seal retainer 26 can have an internal flow path that is straight, substantially straight, and/or tapered inward from an upstream end of the seal retainer 26 to a downstream end of the seal retainer 26. In some embodiments, the seal retainer 26 can have one or more water straightening vanes 27 formed in the internal flow path. The water straightening vanes 27 can reduce turbulence in the water as water moves from the inlet 14 to the nozzle 13. In some embodiments, a nozzle seal 29 can be positioned downstream of the seal retainer 26 to prevent pressurized water from leaking between the seal retainer 26 and the nozzle 13.

Figure 3:
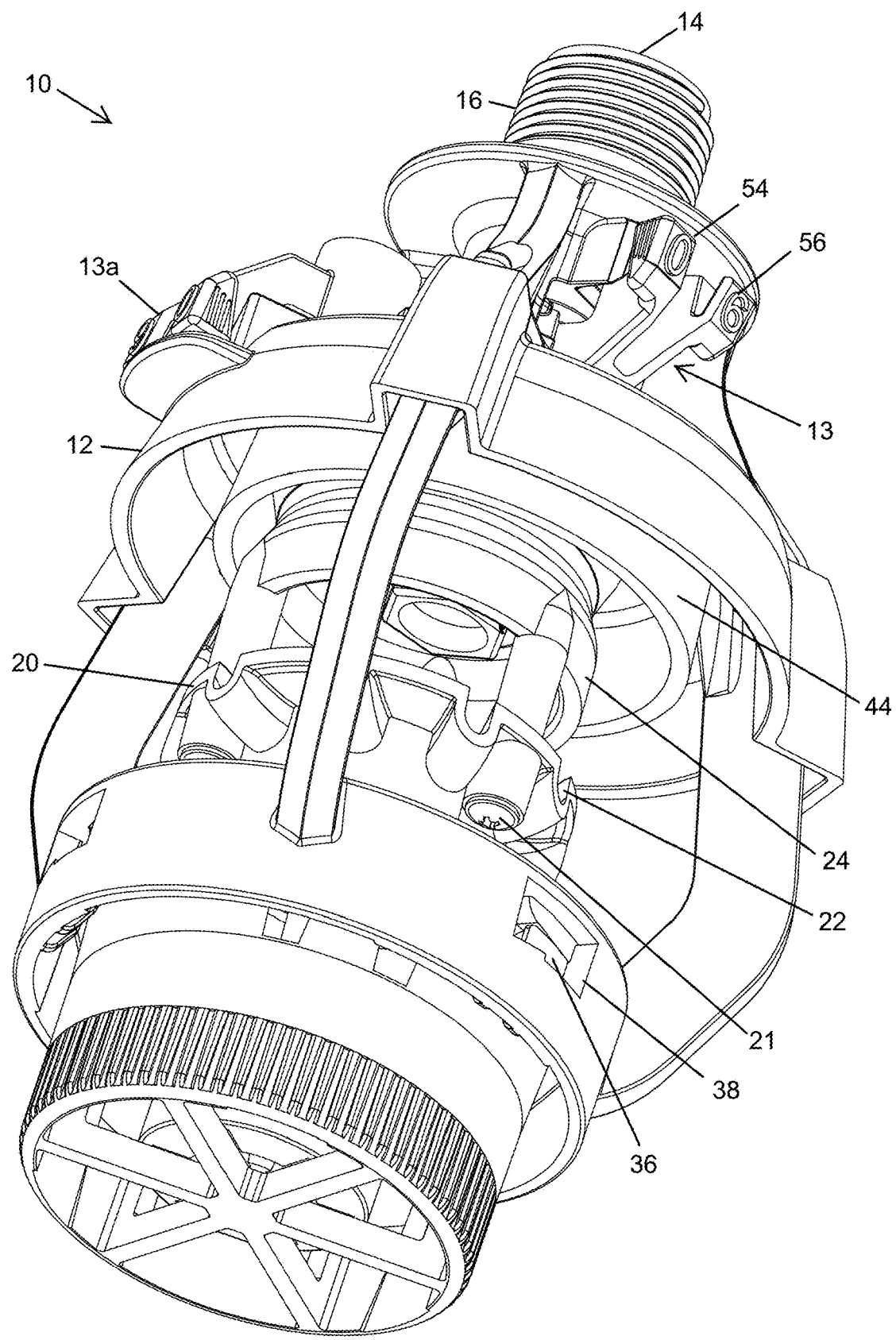
FIG. 3 is a bottom perspective view of the sprinkler of FIG. 2.

The upstream end of the seal retainer 26 can be positioned flush or downstream of the water inlet 14 and/or the bracket 11. The nozzle 13 can be removed and reinstalled to position on the bracket 11 without any tools. As illustrated in FIG. 3, a user can pinch tabs 54 and 56 on the nozzle 13 to install the nozzle 13 and can move the nozzle 13 downwards to remove the nozzle 13. The nozzle 13 similarly can be replaced by reversing the procedure. In some embodiments, the nozzle can be similar to, or the same as the nozzle disclosed in U.S. Pat. No. 8,556,196, titled QUICK CHANGE NOZZLE of Lawyer et. al., issued on Oct. 15, 2013, the entire content of which is incorporated by reference herein and made part of the present specification. The nozzle 13 can also include an internal taper to accelerate and/or pressurize water flow out from the nozzle 13.

Figure 2:
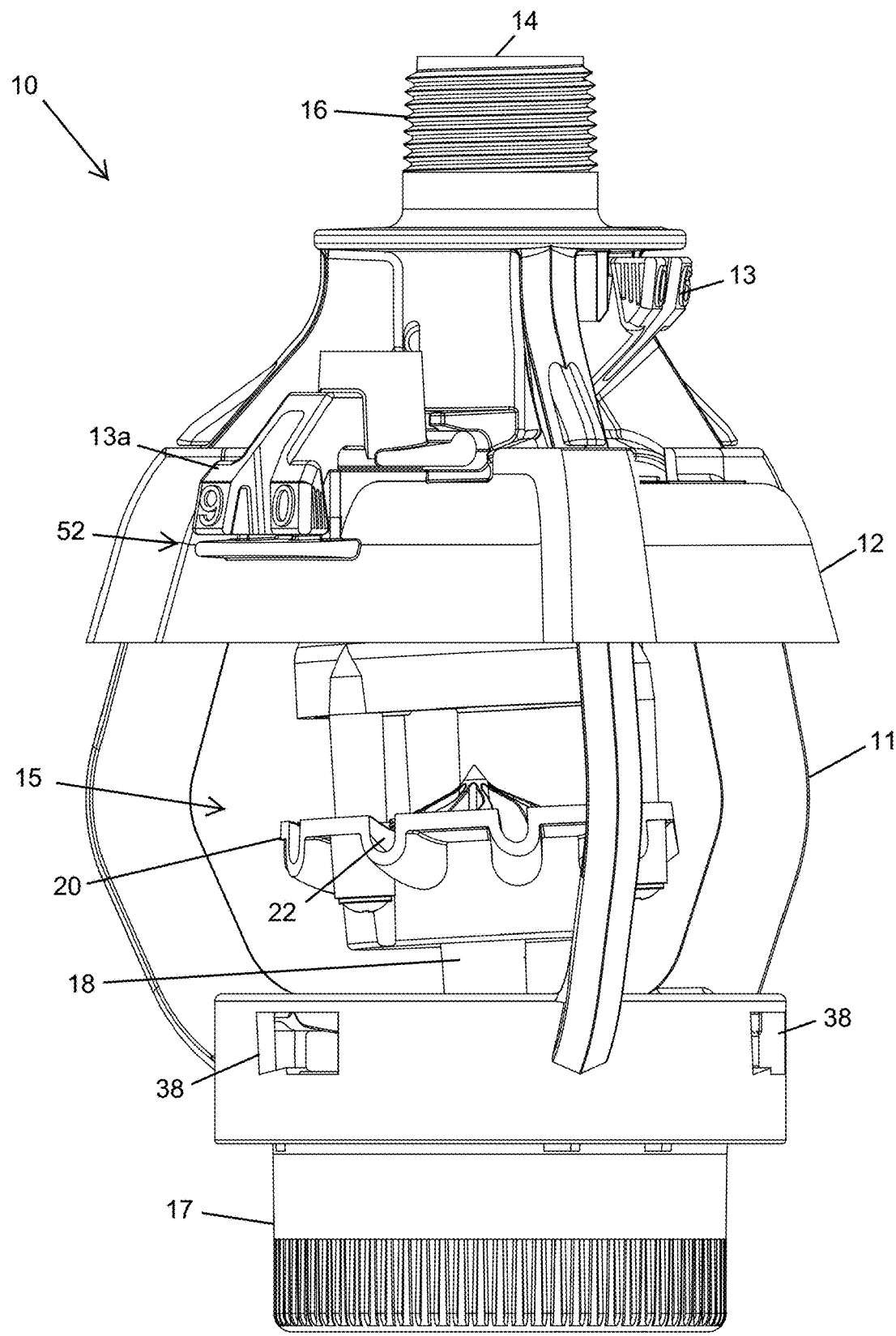
FIG. 2 is a front plan view of an embodiment of a sprinkler with a nutating distribution plate.

With reference to FIG. 2, a shroud 12 can cover an upstream area of the bracket 11. In some embodiments, the shroud 12 can act as an umbrella to protect components, including but not limited to moving components that are located under the shroud 12. In some embodiments, the shroud 12 can include a receiving station 52 to hold a spare nozzle 13a. As illustrated in FIG. 5, the shroud 12 can have two receiving stations 52 to hold spare nozzles 13a and 13b respectively. In some embodiments, the shroud 12 can have more than two receiving stations for holding more than two spare nozzles. In some embodiments, the shroud 12 can be removed or removable. In some embodiments, the shroud 12 can snap onto one or more arms of the bracket 11. The bracket 11 can include a plurality of arms (for example, two, three, four, or more) spaced apart from one another. As illustrated in FIGS. 2-5, the bracket 11 has three arms. The one or more of the arms can have an outwardly bulging middle section. The plurality of arms can be joined at one or both of their upstream and downstream ends with a collar, wherein the upstream end of the bracket 11 is closer to the water inlet 14 than the downstream end.

Figure 4:
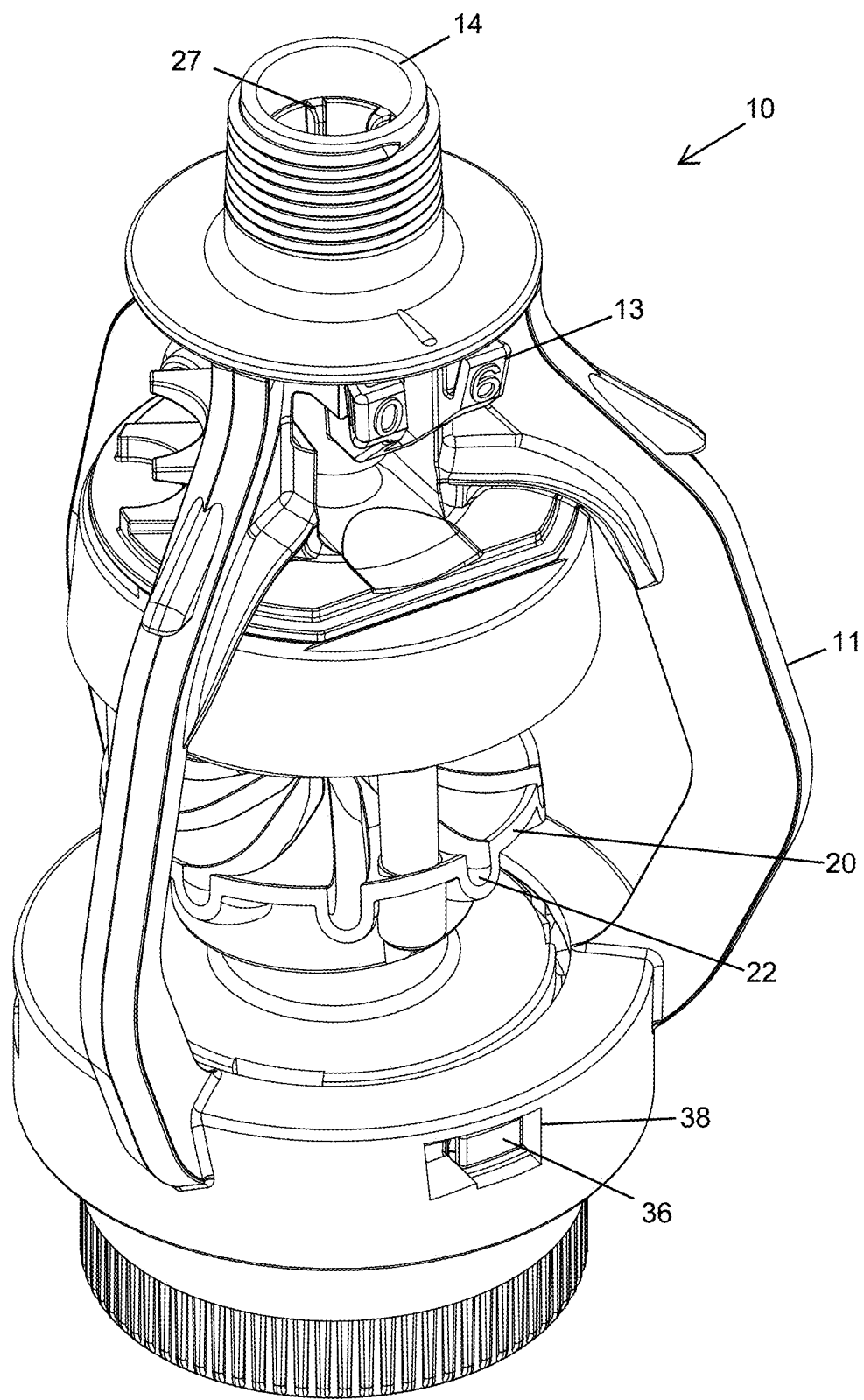
FIG. 4 is a top perspective view of the sprinkler of FIG. 2 with a shroud removed for illustrative purposes.
Figure 5:
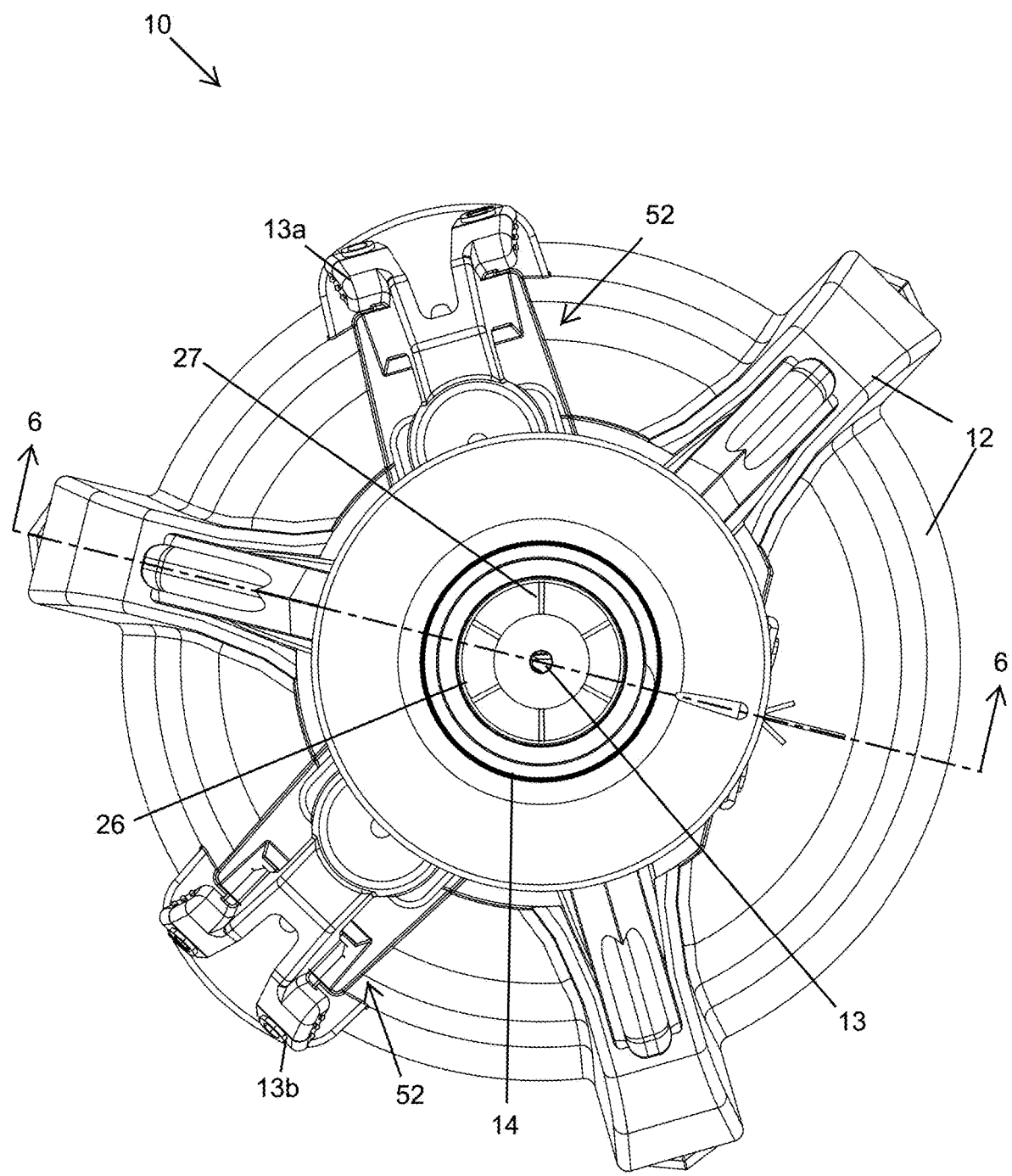
FIG. 5 is a top view of the sprinkler of FIG. 2.

With reference to FIGS. 2-4, the sprinkler 10 can include a deflector assembly 15 supported by the bracket 11. The deflector assembly 15 can be surrounded by the plurality of arms of the bracket 11 and/or a lower bearing housing 17. The lower bearing housing 17, which will be described in greater detail below, can be coupled to the bracket 11.

Figure 8:
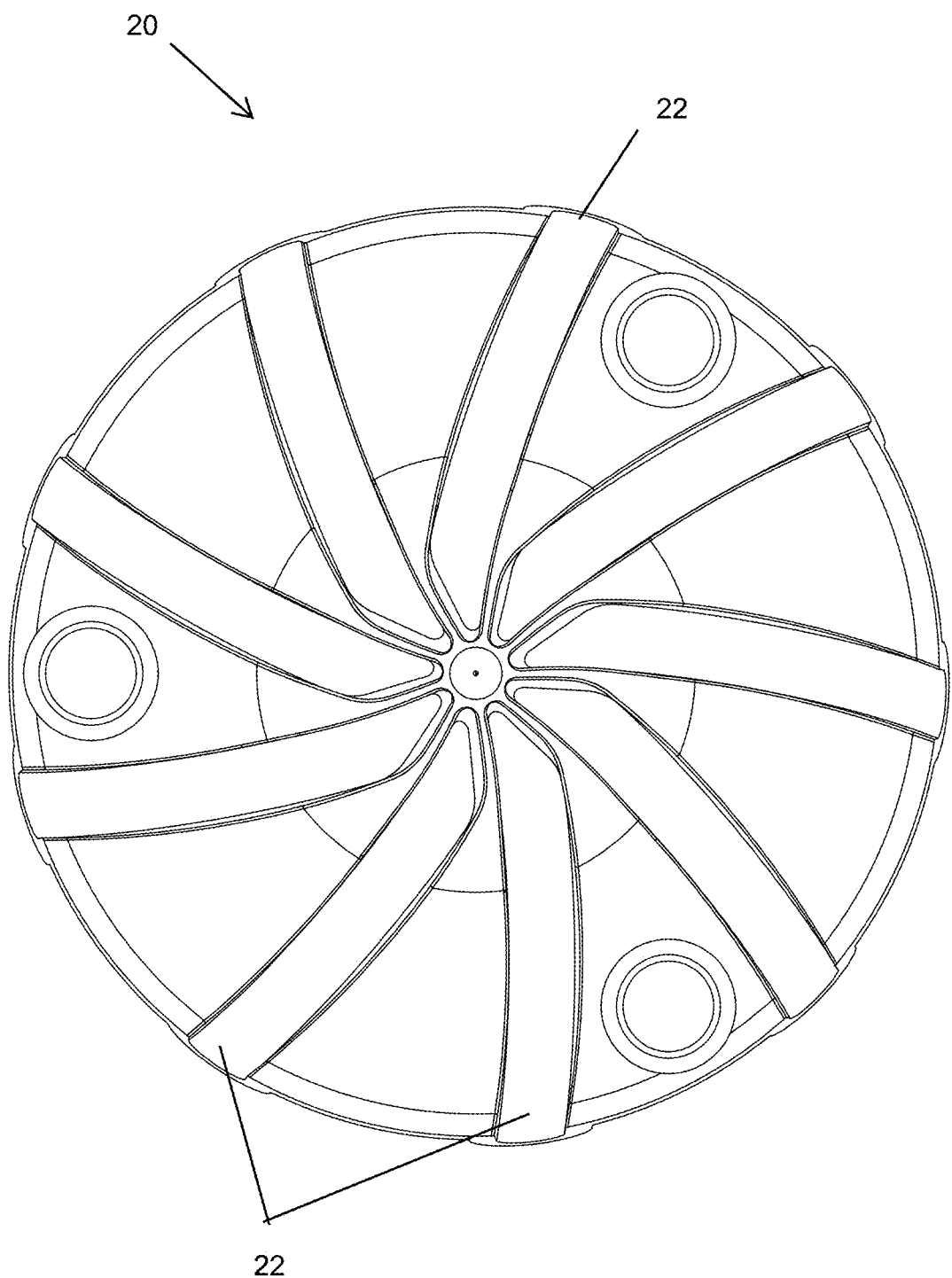
FIG. 8 is a top view of the distribution plate of the sprinkler of FIG. 6.

The deflector assembly 15 can include the distribution plate 20. With reference to FIGS. 4 and 8, in some embodiments, the distribution plate 20 can include one or more grooves 22 on an upstream side of the distribution plate 20. The upstream side of the distribution plate faces the nozzle 13. The one or more grooves 22 can channel the water exiting the nozzle 13 to be ejected in a controlled direction. In some embodiments, the one or more groves 22 can be radially angled to cause the deflector assembly 15 to rotate when the water from the nozzle 13 impinges the distribution plate 20. In some embodiments, the one or more grooves 22 can be curved. In some embodiments, such as shown in FIG. 8, the one or more grooves 22 can be identical or substantially identical in shape. The one or more grooves 22 can also be uniformly or substantially uniformly distributed on the upstream side of the distribution plate 20.

Figure 6:
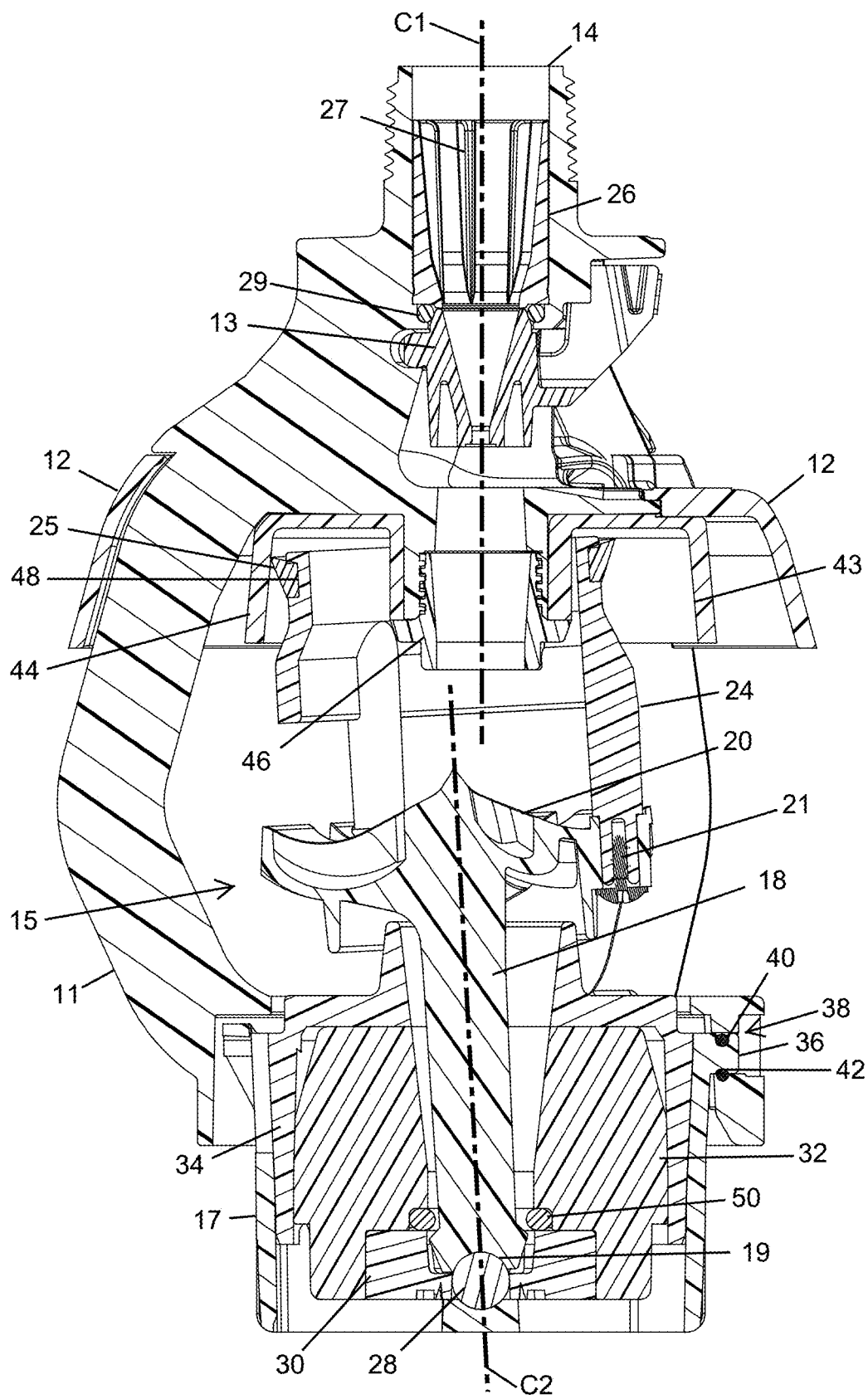
FIG. 6 is a cross-sectional view of the sprinkler of FIG. 2, as viewed along the cut-plane 6-6 of FIG. 5.

With reference to FIGS. 3 and 6, an upper wear ring support 24 can be fastened (such as securely fastened) to the distribution plate 20 of the deflector assembly 15 on the same side as the grooves 22. The upper wear ring support 24 can include one or more arms extending from the upstream side of the distribution plate 20, which can be the same side as the grooves 22. In some embodiments, the upper wear ring support 24 can have three arms to connect with the distribution plate 20. In some embodiments the upper wear ring support 24 can have less than three arms. In some embodiments, the upper wear ring support 24 can have more than three arms. In some embodiments, the upper wear ring support 24 can be removably attached to the distribution plate 20, such as with one or more attachment screws 21 or other attachment methods. In some embodiments, an attachment screw 21 can be installed at each of the one or more arms of the upper wear ring support 24. The attachment screw 21 can be advanced from the side of the distribution plate 20 that faces away from the nozzle 13 toward the side of the distribution plate 20 that faces the nozzle 13.

In some embodiments, such as shown in FIGS. 3 and 6, an outer race 44 can also be positioned upstream of the distribution plate 20. In some embodiments, the outer race 44 can be attached to the bracket 11. In some embodiments, the outer race 44 can be removably attached to the bracket 11. As shown in FIG. 6, a holding nut 46 can be threaded to mating threads formed in the bracket 11 to securely fasten the outer race 44 to the bracket 11. In some embodiments, the outer race 44 can also be removably attached to the bracket 11 by using bayonet mounts, snap rings, keys, or collars or other attachment methods (e.g., attachment structures or methods that do not require use of tools or specialized tools for disconnection). The outer race 44 can be positioned to surround at least a portion of the upper wear ring support 24.

The outer race 44 can provide an inner surface 43 on which a contact portion of the deflector assembly 15 can impact, slide and/or roll. In some embodiments, the contact portion of the deflector assembly 15 can be positioned between the water inlet 14 and the distribution plate 20, or between the nozzle 13 and the distribution plate 20. In some embodiments, the outer race 44 can be position within, or near the shroud 12 so the shroud 12 can protect the inner surface 43 from debris. The contact portion of the deflector assembly 15 can be configured to limit the degree of tilting of the distribution plate 20 with respect to the longitudinal axis of the nozzle 13 during wobbling (as described above) of the deflector assembly 15. In some embodiments, the contact portion can be integrally formed as part the deflector assembly 15. In some embodiments, the contact portion can be integrally formed as part the upper wear ring support 24. In some embodiments, the contact portion can be co-molded to the upper wear ring support 24.

As shown in FIG. 6, the contact portion of the deflector assembly 15 can include a wear ring 25. The wear ring 25 can be installed in a groove 48 formed on the upper wear ring support 24 of the deflector assembly 15. In some embodiments, the wear ring 25 can contact the inner surface 43 of the outer race 44 during use of the sprinkler 10, including normal operation of the sprinkler 10. In some embodiments, contacts between one or more surfaces of the wear ring 25 and the inner surface 43 of the outer race 44 can restrict the angular movement of the upper wear ring support 24. As the upper wear ring support 24 is fixedly attached to the distribution plate, the distribution plate 20 can also be maintained in a correct position relative to the nozzle 13 during normal operation. The correct position can allow water out of the nozzle 13 to impinge the distribution plate 20. In some embodiments, the wear ring 25 can provide a resistive interface between the upper wear ring support 24 and the outer race 44 to slow or otherwise regulate the speed of rotation of the upper wear ring support 24 and the distribution plate 20 during operation of the sprinkler 10.

In some embodiments, the wear ring 25 can be a pliable, elastic, resilient, and/or flexible material that can cushion the impact of the upper wear ring support 24 relative to the outer race 44 during operation. In some embodiments, the wear ring 25 can be an O-ring. In some embodiments, the grooves 22 on the distribution plate 20 can also be configured to allow contact between the rotating upper wear ring support 24 (and the wear ring 25) and the inner surface 43 of the outer race 44 to cause the wear ring 25 to tighten the holding nut 46 at the threaded connection to the bracket 11. For example, the grooves 22 can be angularly curved in a direction (for example, clockwise or counterclockwise) that is the same as the direction for tightening the holding nut 46 onto the bracket 11. The tightening of the holding nut 46 can reduce the likelihood of the holding nut 46 and/or the outer race 44 loosening and/or unthreading from the bracket 11 during operation of the sprinkler 10. In some embodiments, the outer race can be keyed to the bracket 11 to prevent rotation of the outer race 44 relative to the bracket 11.

With continued reference to FIG. 6, in some embodiments, the deflector assembly 15 can include a stem 18 extending from the distribution plate 20 on the opposite side of the distribution plate 20 than the grooves 22, which can be the side of the distribution plate 20 that faces away from the nozzle 13. In some embodiments, the stem 18 can be loosely coupled (such as hingedly and/or translationally coupled) to the lower bearing housing 17 and/or the bracket 11 such that the deflector assembly 15 can wobble (e.g., tilt, oscillate, bounce, shake, or otherwise move) and rotate when pressurized water from the nozzle 13 impinges the distribution plate 20.

In some embodiments, a bearing can be positioned between the stem 18 and the lower bearing housing 17 and/or the bracket 11. In some embodiments, the bearing can be a surface of the lower housing 17. In some embodiments, the bearing 28 can be removably attached to the lower housing 17. As illustrated in FIG. 6, the bearing can be a ball bearing 28. The ball bearing 28 can have a spherical or substantially spherical shape, or otherwise a curved surface. The ball bearing 28 can support the deflector assembly 15 and/or provide a smooth surface for the deflector assembly 15 to move relative to the lower housing 17. In some embodiments, a recess 19 can be formed in the lower end of the stem 18. In some embodiments, the recess 19 can be a cone shape or other preferred concave surface. In some embodiments, the recess 19 can be a cup shaped recess. In some embodiments, the recess 19 is sized to fit over a portion of the ball bearing 28. The recess 19 can allow the stem 18 to rotatably pivot at the ball bearing 28 as well as slide or translate relative to the curved surface of the ball bearing 28.

As illustrated in FIG. 6, the sprinkler 10 can include the deflector support structure as described below configured to support the ball bearing 28 and/or the deflector assembly 15. For example, a ball bearing retainer 30 can surround at least a portion of the ball bearing 28. In some embodiments, a weight 32 can be installed at least partially inside of the lower bearing housing 17 and surrounding the ball bearing retainer 30. A cover 34 can be place over the weight 32 to retain the weight 32 between the lower bearing housing 17 and the ball bearing retainer 30. In some embodiments, the cover 34 can be removable.

A central cavity can be formed in the lower bearing housing 17 by openings and/or cavities in the ball bearing retainer 30, the weight 32, and/or the cover 34. The central cavity can allow the stem 18 to access to the ball bearing 28. The stem 18 can have an enlarged end portion that is opposite the end connected to the distribution plate 20 so that a flexible retainer ring 50 can be mounted around a region of the stem 18 adjacent to the enlarged end portion. The retainer ring 50 can be seated at least partially in a groove in the weight 32 so as ensure contact between the stem 18 and the ball bearing 28, and/or to prevent the stem 18 from disengaging the ball bearing 28. The retainer ring 50 can be an O-ring.

In some embodiments, the lower bearing housing 17 can be removably attached to the bracket 11. In some embodiments, the cover 34 is only removable when the lower bearing housing 17 is not installed to the bracket 11. Coupling of the lower bearing housing 17 and the bracket 11 will be described with reference to FIG. 6. The lower bearing housing 17 can include one or more attaching lugs 36. The bracket 11 can have openings 38 configured to receive the attaching lugs 36. The openings 38 can be located on the collar connecting downstream ends of the plurality of arms of the bracket 11. In some embodiments there can be three attaching lugs 36 and three openings 38. In some embodiments there can be fewer than three attaching lugs 36 and openings 38. In some embodiments there can be more than three attaching lugs 36 and openings 38. The attaching lugs 36 and/or the openings 38 can be substantially uniformly spaced or otherwise around the lower bearing housing 17 and/or the bracket 11. Each of the attaching lugs 36 can engage one of the openings 38 to removably couple the lower bearing housing 17 to the bracket 11. The lower bearing housing 17 can be at least partially disposed within a cavity of the bracket 11 (such as within a cavity of the collar) when coupled to the bracket 11.

In some embodiments, a wear bumper 40 can surround (for example, completely surround) each of the attaching lugs 36. In some embodiments, the attaching lug 36 can each have a groove 42 to retain a wear bumper 40. In some embodiments, the wear bumper 40 can fill at least a portion of any open space between the attaching lug 36 and the opening 38. In some embodiments, the lower bearing housing 17 can be coupled to the bracket 11 with each of the openings 38 surrounding at least a portion of each of the attaching lugs 36 and each of the wear bumpers 40.

In some embodiments, the openings 38 can also form a bayonet locking mechanism so that the lower bearing housing 17 can be rotated to a locked position when each of the attaching lugs 36 locks into each of the bayonet lock formed at the opening 38. A user can also look through the openings 38 and visually verify that the attaching lugs 36 are in the locked position.

With continued reference to FIG. 6, the deflector assembly 15 can be supported by the ball bearing 28. All or substantially all of the weight of the deflector assembly 15 can be positioned on the ball bearing 28. The weight on the ball bearing 28 can cause the upper wear ring support 24 and the center line C2 of the distribution plate 20 to be off-axis of the center axis C1, which can be the longitudinal axis of the nozzle 13, when water is not being applied to the sprinkler 10. The pre-tilting of the distribution plate 20 can cause the water from the nozzle 13 to apply more force to one side of the distribution plate 20 than to an opposite side of the distribution plate 20. The unequal weight distribution on the distribution plate 20 can cause the upper wear ring support 24 to move towards an opposite side of the outer race 44 and start the nutating (for example, rotating and wobbling) action of the distribution plate 20 when the pressurized water is supplied to the sprinkler 10. In some embodiments, the pre-tilting of the distribution plate 20 can reduce the likelihood of prolonged alignment between the center line C2 of the distribution plate 20 and the center axis C1 of the nozzle 13 when water first impinges the distribution plate 20.

Example Disassembling and Reassembling of Certain Embodiments of a Sprinkler

In some instances, it may be desirable to replace and/or to clean debris from the inner surface 43 of the outer race 44. A user may also desire to clean or replace some of the components of the deflector assembly 15. In some embodiments, a user may need to replace or repair worn or damaged components in the sprinkler 10. Examples of worn or damaged components, and/or components that require cleaning can include but are not limited to the outer race 44, upper wear ring support 24, wear ring 25, distribution plate 15, and/or ball bearing 28. A user can also remove and reinstall the nozzle 13 and/or spare nozzles without using any tools as described above.

To disassemble the sprinkler 10 to service any worn or damaged parts and/or to clean any parts, a user can detach the lower bearing housing 17 from the bracket 11 by disengaging the attaching lugs 36 from the bracket openings 38. In some embodiments, the user can disengage the attaching lugs 36 from the bracket openings 38 without using any tools. In some embodiments, the user can use a tool such a standard-sized screw driver to pry the attaching lugs 36 out of the bracket openings 38. In some embodiments, the user can rotate the lower bearing housing 17 until the attaching lugs 36 are unlocked from the bracket 11 to remove the lower bearing hosing 17.

In some embodiments, all of the components of the deflector assembly 15 can be removed from the bracket 11 and/or all of the components of the deflector assembly 15 can be accessible with the removal of the lower bearing housing 17. In some embodiments, a user can disassemble the wear ring 25 from the upper wear ring support 24, for example, from the groove 48 on the upper wear ring support 24, to replace or repair the wear ring 25.

Figure 7:
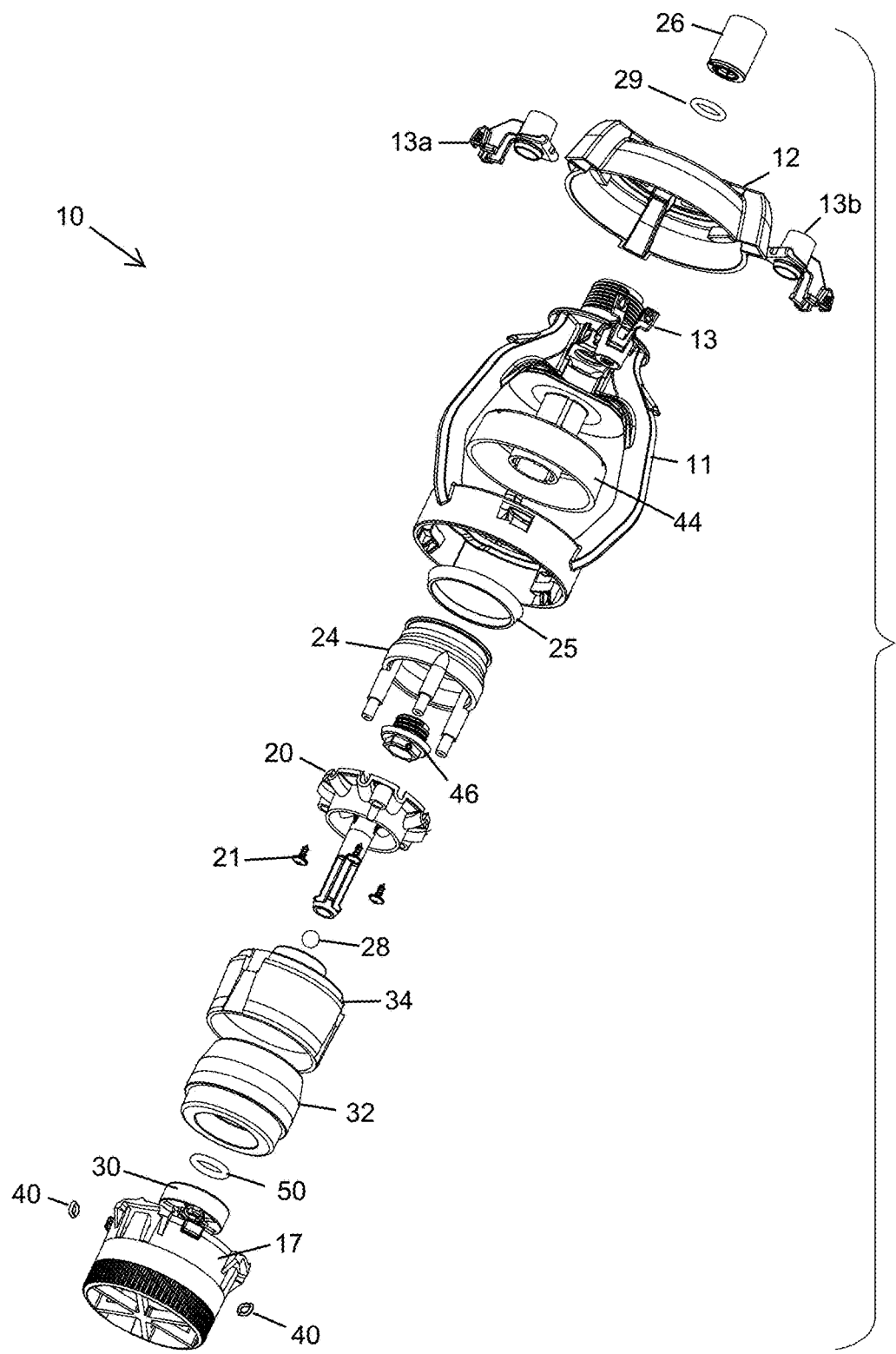
FIG. 7 is a perspective exploded view of the sprinkler of FIG. 2.

In some embodiments, the user can disengage the deflector assembly 15 from the lower bearing housing 17 by pulling the deflector assembly 15 past the flexible retainer ring 50 (see FIGS. 6 and 7). The user can also optionally remove the weight cover 34 and/or the weight 32 to clean or replace the ball bearing 28. The user can also optionally remove the wear bumper 40 to clean or replace the wear bumper 40, and/or to clean the retaining grooves 42 of the attaching lugs 36.

In some embodiments, the user can also unscrew the holding nut 46 and remove the outer race 44 from the bracket 11. The user can unscrew the holding nut 46 without any tools, or with a standard-sized wrench or other off-the-shelf tools. In some embodiments, the user can unscrew the attachment screws 21, for example, using a standard-sized screwdriver, to detach the distribution plate 20 from the upper wear ring support 24.

In some embodiments, such as illustrated in FIG. 7, every component of the sprinkler 10 can be serviced, cleaned, and/or replaced by a user with minimal tools and effort (such as without any tools, or with off-the-shelf tools like a standard-sized screw driver and/or a standard sized wrench). The user can disassemble the sprinkler components in any order.

The user can reassemble the components to resume normal operation of the sprinkler 10. For example, the user can reattach the outer race 44 to the bracket 11 with the holding nut 46. The user can mount the cleaned or new wear ring 25 onto the upper wear ring support 24. The user can fixedly couple the distribution plate 20 and the upper wear ring support 24 with the attachment screws 21. The user can also reassemble the cleaned or new ball bearing 28, the ball bearing retainer 30, the retainer ring 50, and the weight 32 into the lower bearing housing 17, and replace the weight cover 34. The user can reinsert the stem 18 into the central cavity in the lower bearing housing 17 past the retainer ring 50 so that a surface of the stem recess 19 contacts the ball bearing 28. The user can also re-engage the attaching lugs 36 (which can include mounting the wear bumper 40 onto the attaching lug 36) and the bracket openings 38 to attach the lower bearing housing 17 to the bracket 11. The user can reassemble the components in any order.

The ability to service the sprinkler 10 with minimal tools and effort can allow a user to service the sprinkler 10 in the field, which can be more convenient and/or efficient to the user (such as an end-user) than requiring a large number of and/or special tools to assemble and disassemble a sprinkler.

Example Operations of Certain Embodiments of a Sprinkler

Figure 9:
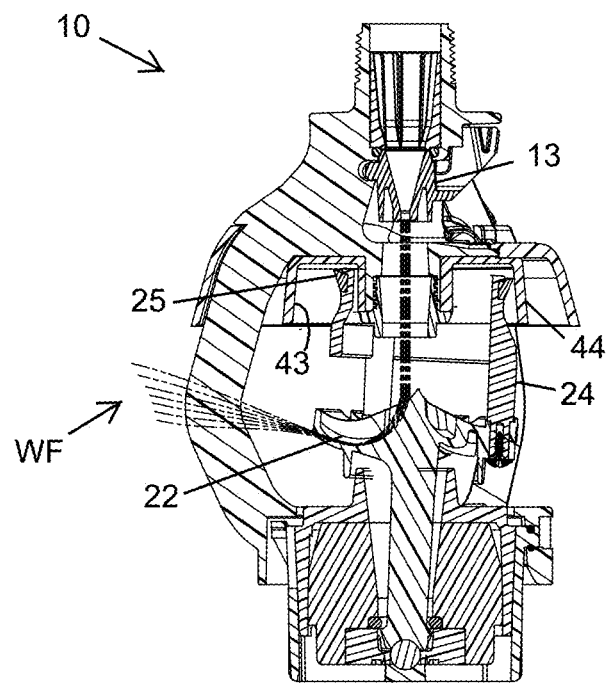
FIG. 9 is a cross-sectional view of the sprinkler of FIG. 2, as viewed along the cut-plane 6-6 of FIG. 5 when the deflector assembly is in a first tilt position.
Figure 10:
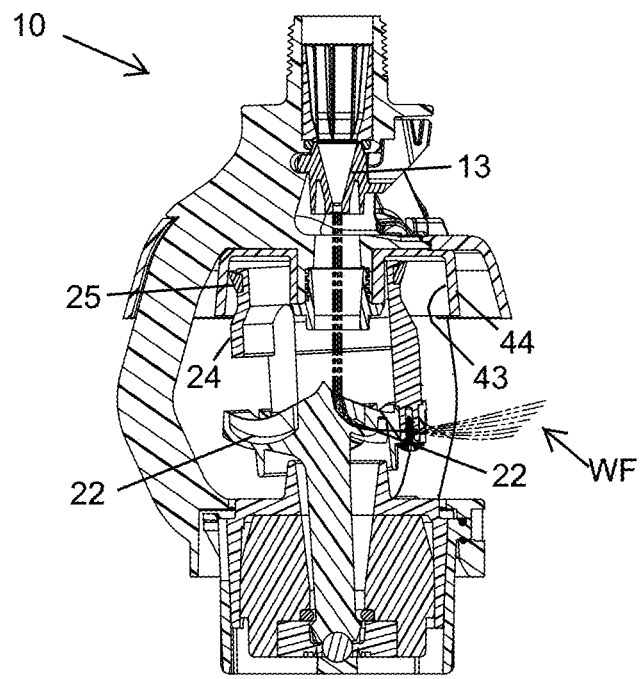
FIG. 10 is a cross-sectional view of the sprinkler of FIG. 2, as viewed along the cut-plane 6-6 of FIG. 5 when the deflector assembly is in a second tilt position.

FIGS. 9 and 10 illustrate example operations of the sprinkler 10. As illustrated in FIG. 9, when water pressure is applied to the sprinkler 10, water from the nozzle 13 can impinge the distribution plate 20 and cause the distribution plate 20 to move angularly to a first side (the right hand side as shown in FIG. 9). In some embodiments, the distribution plate 20 can be pre-tilted to the first side. The upper wear ring support 24 can move until the wear ring 25 contacts the inner surface 43 of the outer race 44. Additionally, the deflector assembly 15 can begin to rotate as a result of the water exiting the curved groves 22. As the deflector assembly 15 rotates, water can be dispersed in different directions. FIG. 9 illustrates the direction of water flow WF away from the distribution plate 20 when the distribution plate 20 is at the first side.

As shown in FIG. 10, the deflector assembly 15 can move to a second side (the left hand side as shown in FIG. 10) relative to the first side illustrated in FIG. 9 as the water impinges on a different area of the distribution plate 20. The direction of water flow WF can change after the deflector assembly 15 has moved to the second side. Continuous rotation of the distribution plate 20 about the axis C2 (see FIG. 6) combined with the axis C2 moving back and forth relative to the axis C1 (see FIG. 6) can create a nutating movement of the distribution plate 20. The nutating movement of the distribution plate 20 can produce a substantially uniform water flow pattern on the plants being irrigated. The relative positioning of the bearing housing 17 and the distribution plate 20 in relation to the outer race 44 can reduce and/or minimize forces between the wear ring 25 and the inner surface 43 to reduce wear and/or extend the useable life of the wear ring 25 and the outer race 44.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extends beyond the specifically disclosed embodiments to other alternative embodiments and/or uses of the embodiments and certain modifications and equivalents thereof. For example, some embodiments are configured to operate oriented such that the distribution plate is positioned above the nozzle and the nozzle directs water upward. Accordingly, it is intended that the scope of the sprinkler herein-disclosed should not be limited by the particular disclosed embodiments described above, but should be determined only by a fair reading of the claims that follow.

What is claimed is:

1. A sprinkler assembly comprising:
   a water inlet;
   a frame connected to the water inlet;
   a nozzle in fluid communication with the water inlet and positioned downstream of the water inlet, the nozzle configured to direct water out of the nozzle along a nozzle axis;
   a bearing positioned downstream of the nozzle and supported by the frame; and
   a deflector assembly between the nozzle and the bearing and supported by the bearing, the deflector assembly including:
      a distribution plate configured to deflect water from the nozzle, the distribution plate positioned downstream of the nozzle,
      an upper wear ring support having one or more arms connected to the distribution plate, the one or more arms extending upstream from the distribution plate,
      a wear ring having an outer circumference and being removably positioned on the upper wear ring support such that the wear ring is positioned downstream of the water inlet and upstream of the distribution plate; and
      an outer race connected to the frame and having an inner surface, the inner surface surrounding at least a portion of the outer circumference of the wear ring and being configured to contact the inner surface,
   wherein:
      the deflector assembly is configured to move with respect to the nozzle axis in one or both of a rotational and a tilting direction;
      the bearing is configured to bear substantially all of an axial load created by a weight of the deflector assembly; and
      the inner surface of the outer race contacts the outer circumference of the wear ring to limit a tilting motion of the deflector assembly about the bearing.

2. The sprinkler assembly of claim 1, wherein the distribution plate comprises a stem extending from a side of the distribution plate facing away from the nozzle to the bearing.

3. The sprinkler assembly of claim 2, wherein an open end of the stem comprises a recess, wherein an entirety of the recess receives the bearing.

4. The sprinkler assembly of claim 1, wherein the frame is coupled to a lower bearing housing, the bearing supported by a bearing retainer in the lower bearing housing.

5. The sprinkler assembly of claim 4, further comprising a weight between the bearing retainer and an inner wall of the lower bearing housing.

6. The sprinkler assembly of claim 1, wherein the distribution plate comprises a plurality of grooves on a side of the distribution plate facing the nozzle, the plurality of grooves configured to deflect water from the nozzle.

7. The sprinkler assembly of claim 6, wherein the plurality of grooves are curved.

8. The sprinkler assembly of claim 1, wherein the outer race is secured to the frame by a holding nut.

9. The sprinkler assembly of claim 1, wherein the one or more arms of the upper wear ring support are coupled to the distribution plate by one or more screws.

10. The sprinkler assembly of claim 1, wherein the wear ring comprises an o-ring.

11. The sprinkler assembly of claim 1, wherein resistance between the one or more surfaces of the wear ring and the inner surface of the outer race slows or regulates a speed of rotation of the upper wear ring support and the distribution plate.

12. A sprinkler assembly comprising:
   a water inlet;
   a frame connected to the water inlet;
   a nozzle in fluid communication with the water inlet and positioned downstream of the water inlet, the nozzle configured to direct water out of the nozzle along a nozzle axis;
   a deflector assembly downstream of the nozzle, the deflector assembly comprising:
      a distribution plate configured to deflect water from the nozzle, and
      a stem extending from a side of the distribution plate facing away from the nozzle and terminating at a free end, a bearing supported by the frame and contacting a concave surface of the stem at the free end of the stem;

an outer race coupled to the frame, the outer race comprising an inner surface configured to contact an outer circumference of a contact portion of the deflector assembly, the contact portion positioned upstream of the distribution plate;

an upper wear ring support having one or more arms connected to the distribution plate on a side facing the nozzle, the one or more arms extending upstream from the distribution plate; and a wear ring positioned on the upper wear ring support;

wherein:

the contact portion is disposed on the wear ring;

the outer circumference is configured to contact the inner surface of the outer race;

the deflector assembly is configured to move with respect to the nozzle axis in one or both of a rotational and a tilting direction;

the bearing is configured to bear substantially all of an axial load created by a weight of the deflector assembly; and the inner surface of the outer race limits a tilting motion of the deflector assembly about the bearing.

13. The sprinkler assembly of claim 12, wherein the wear ring is removably positioned on the upper wear ring support.

14. The sprinkler assembly of claim 12, wherein the outer race is secured to the frame by a holding nut.

15. The sprinkler assembly of claim 12, wherein the one or more arms of the upper wear ring support are coupled to the distribution plate by one or more screws.

16. The sprinkler assembly of claim 12, wherein the wear ring comprises an o-ring.

* * * * *